Figure 1:
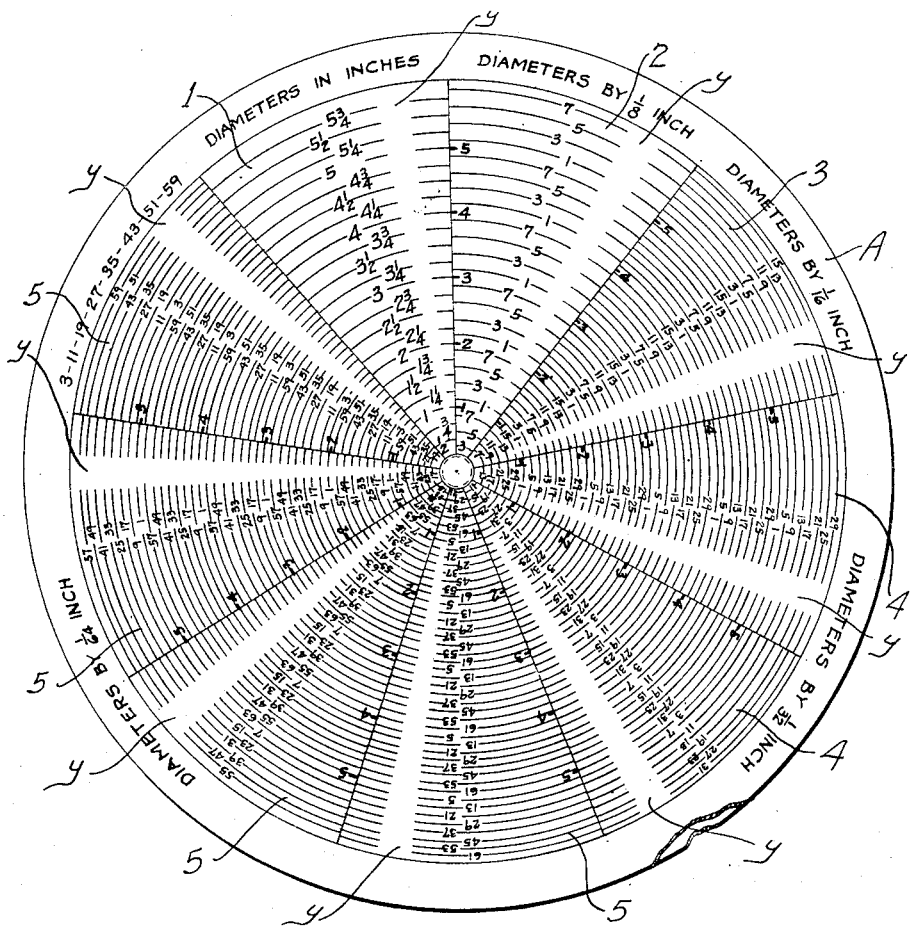

W. V. POGUE.
COMPASS SCALE.
APPLICATION FILED MAY 27, 1920.

1,423,019.

Patented July 18, 1922.

INVENTOR
WEBSTER V. POGUE.
BY
Bakewell Church.
ATTORNEYS

UNITED STATES PATENT OFFICE.

WEBSTER V. POGUE, OF MOUNT VERNON, NEW YORK.

COMPASS SCALE.

1,423,019.   Specification of Letters Patent.   Patented July 18, 1922.

Application filed May 27, 1920. Serial No. 384,732.

*To all whom it may concern:*

Be it known that I, WEBSTER V. POGUE, a citizen of the United States, residing at Mount Vernon, New York, have invented a certain new and useful Improvement in Compass Scales, of which the following is a full, clear, and exact description, such as will enable others skilled in the art to which it appertains to make and use the same.

This invention relates to a device for assisting a draftsman in the operation of setting a compass or other circle describing instrument.

Heretofore in setting a compass to describe a circle of given diameter it has been customary to first compute the radius and then set the compass to an ordinary drawing scale. Then, to assure accuracy, it has been necessary to make a trial of the setting, usually on a separate sheet. The above operations consume considerable time, and when relatively intricate fractions are involved there exist the possibility of error in computing the radius.

The main object of my invention is to provide a device by means of which compasses or other circle describing instruments can be set quickly and accurately to describe circles of various diameters without first computing the radius of the circle to be described.

Another object is to provide a device for the purpose described which enables a compass to be set and tested without removing the compass from the device.

And still another object is to provide a compass scale that has a transparent portion that protects the lines, figures or other markings of the scale and on which testing arcs or lines can be drawn and erased without destroying or defacing the markings of the scale. Other objects and desirable features of my invention will be hereinafter pointed out.

To this end I have devised a compass scale which comprises a number of segmental sections provided with arcs of different radii that are described from a center common to the arcs of all of the segments and indicia combined with said arcs that represent the diameters of the circles of which the arcs form a part. The segmental sections of the scale preferably constitute divisions or sections of a circular area and the arcs of each section are arranged in concentric relation and are spaced regularly, corresponding to some common fraction of an inch or other standard unit of linear measurement. Each section of the scale or a plurality of similar sections is used for designating circles whose diameters vary by a particular fraction of an inch, and the arcs of each segmental section are preferably broken away at one or more points so as to form gaps therein that can be filled in by testing arcs or lines drawn on a transparent member that is superimposed upon the member of the scale that contains the segments and arcs.

Figure 2:
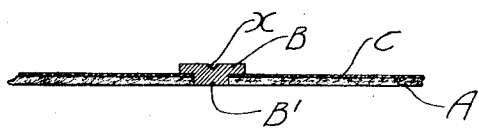

Figure 1 of the drawings is a top plan view of a scale constructed in accordance with my invention; and Figure 2 is an enlarged vertical sectional view, illustrating the center member of the scale on which the needle point on one leg of the compass is placed during the operation of setting or adjusting the compass.

Referring to the drawings which illustrate the preferred form of my invention, A designates a member, preferably of circular shape and formed from a piece of stiff sheet material such as cardboard, celluloid or the like and provided with a number of segmental sections having concentric arcs of different radii, all of which are described from a center $x$ common to all of said segmental sections and the arcs of same. When the scale is adapted for use under the English system of measurement, the segmental sections of the scale and the arcs of said sections are marked with numerals that designate inches and subdivisions of an inch, such as eighths, sixteenths, thirty-seconds and sixty-fourths. As the sixty-fourth is the smallest subdivision of an inch ordinarily used in drafting, the scale herein illustrated is provided with segmental sections that can be used for setting a compass, for describing circles varying from about twenty-one sixty-fourths of an inch to six inches in diameter, but it will, of course, be obvious that the scale could be provided with smaller subdivisions of an inch or subdivisions of millimeters.

In order to provide sufficiently wide spacing between the adjacent arcs of the sections of the scale and at the same time be able to describe a circle of any dimensions down to the sixty-fourth fraction of an inch, I prefer to provide the scale with nine segmental sections, as shown in Figure 1, the section designated by the reference character 1 being assigned to even inches, halves and quarters, the section 2 to eighths, the section 3 to sixteenths, the two sections 4 to thirty-seconds and the four sections 5 to sixty-fourths. In view of the fact that my scale is adapted primarily for assisting a draftsman in setting a compass when relatively intricate fractions are involved, such, for example, as setting a compass to describe a circle three and five thirty-seconds inches in diameter, I prefer to arrange and mark the arcs of the various sections so that they represent fractions having odd numerators, thereby making it possible to space the arcs farther apart than would be possible if each section were provided with arcs representing fractions having even and also odd numerators. Accordingly, the first arc of section 2, which is assigned to eighths, namely, the arc arranged nearest to the center $x$ of the scale, is marked with the numeral three so as to indicate that said arc represents three-eighths of an inch, the second arc of said section is marked with the numeral five to designate that said arc is to be used in setting the compass to describe a circle five-eighths of an inch in diameter, and the third arc of said section is marked with the numeral seven to represent seven-eighths of an inch. The fourth arc of section 2 is marked with the numeral one to designate that said arc is used in setting the compass to describe a circle one and one-eighths inches in diameter and the remaining arcs of said section 2 are marked consecutively three, five, seven, one, etc. The section 1 to the left of the section 2 has concentric arcs spaced one-eighth of an inch apart, arranged in stepped relation with the arcs of the section 2 and marked with the numerals one-half, three-fourths, one, one and one-fourth, one and one-half, etc., so as to represent divisions of an inch that vary by one-fourth of an inch. The purpose of providing the scale with two sections for thirty-seconds and four sections for sixty-fourths is to provide sufficient space between the arcs of said sections to provide for marking said arcs and to eliminte the possibility of error as might occur if the arcs respesenting subdivisions of one-thirty-second of an inch were all arranged in the same segmental section and the arcs respresenting subdivisions of one-sixty-fourth of an inch were all arranged in a single section. By constructing the scale in this manner I am able to space the arcs in the sections 4 and 5 one sixteenth of an inch apart.

The various segmental sections of the scale are provided with suitable headings so as to indicate what the arcs in said respective sections represent. For example, the section 1 is provided with a heading consisting of the words "Diameters in inches," the section 2 is provided with a heading consisting of the words "Diameters by one-eighth inch," the section 3 is provided with a heading consisting of the words "Diameters by one-sixteenth inch," the two sections 4 are provided with a heading consisting of the words "Diameters by one-thirty-second inch," and the four sections 5 are provided with a heading consisting of the words "Diameters by one-sixty-fourth inch." If desired, a series of numbers can be arranged at the outer end of each of the sections 4 and 5 to designate the numerators of the fractions in the respective sections, thereby enabling the draftsman to quickly choose the particular section of the device that has to be used to set the compass. In the accompanying drawings I have shown only one of the sections 5 provided with such a series of numbers, but it will be understood that in actual practice the other sections 5 and the section 4 are each provided with numbers representing the numerators of the fractions in said sections. In order to prevent the possibility of error which might occur if the numerals representing the arcs of the various segments were placed either above or below said arcs, I prefer to locate the designating numeral of each arc in a break or gap in the arc, and in order that the designating numerals of the arcs may be of maximum size, I prefer to stagger the designating numerals of the arcs of each section, as shown in Figure 1. If desired, each segmental section of the scale may be provided with numerals designated in red or in any other distinctive manner that represent even inches, so as to facilitate the correct setting of the compass.

The center $x$ of the scale on which the needle point on one leg of the compass is placed should preferably be made of some wear-resisting material such as metal, fibre, celluloid or the like, and in order to facilitate the manufacture and assure accuracy, I prefer to form the center $x$ in the top face of a member B that is provided on its underside with a cylindrical extension B' that projects through a hole located at the center of the member A, the member B being secured to the member A by cement, or in any other suitable manner. In constructing the member B the hole at the center of same which receives the cylindrical extensions B' on the member B is used as a gauge in printing the lines on the member A that forms the arcs of the various segmental sections of the member A.

A transparent member C, preferably formed of unglazed celluloid, is arranged over the member A, so as to protect the lines, figures or other markings on the member A and make it possible to erase lines or arcs drawn on the member C for the purpose of testing the setting of the compass without destroying or defacing the markings of the scale. I also prefer to provide the arcs of the various sections on the member A with one or more gaps indicated by the reference character *y* in the sections of Figure 1, so as to enable the setting of the compass to be tested by drawing a line on the transparent member C, so as to fill in the gap of the arc on which the movable leg of the compass is set. In the form of my invention herein illustrated the transparent member C is permanently connected at its center to the member A by means of the hard center member B whose projection B' projects through aligned holes in the members C and A. While I prefer to permanently connect the hard center member B to the members A and C, this is not essential, for if desired, the device can be so constructed that the portion of same that contains the center depression *x* for the needle point on one leg of the compass can be removable. While I prefer to print the markings of the device on a member that is covered with a piece of transparent material, as shown herein, I wish it to be understood that my invention is not limited to such a construction.

In using my improved scale for setting a compass, the needle point on one leg of the compass is placed in the conical depression *x* in the center member B, and the other leg of the compass is adjusted until it aligns with the arc on the scale A that represents the diameter of the circle which it is desired to describe. For example, if it were desired to describe a circle two and thirteen-sixty-fourths inches in diameter, one leg of the compass is arranged in engagement with the center *x* of the scale, and the other leg is adjusted until it aligns with the arc on one of the sections 5 which represents a circle whose diameter is two and thirteen-sixty-fourths inches. Thereafter, the compass is rotated so as to draw a line on the transparent member C that fills in the gap in the arc which represents a circle of two and thirteen-sixty-fourths inches in diameter.

A scale of the construction above described enables a compass or other circle describing instrument to be set quickly and accurately to describe circles of various diameters without first computing the radius of the circle to be described, and it enables a compass to be set and tested in practically one operation without removing the compass from the device.

Having thus described my invention, what I claim as new and desire to secure by Letters Patent, is:

1. A compass scale, comprising a member provided with a plurality of segmental sections having regularly spaced arcs that are parts of circles of different diameters, the arcs of each section corresponding to a diameter of some common fraction of an inch or other standard unit of linear measurement and the arcs in each segmental section representing circles of different diameters from those represented by the arcs of the adjoining sections.

2. A compass scale, comprising a member provided with a plurality of groups of concentrically-arranged arcs, a center point located on said member common to all of said arcs and adapted to receive one leg of a compass or other circle describing instrument, each of said groups representing a subdivision of an inch or other standard unit of linear measurement and the arcs of each group being spaced equally and arranged in concentric relation, and means for indicating that the arcs of one group represent circles of different diameters than those represented by the arcs of another group.

3. A compass scale provided with a group of concentric arcs spaced regularly, and having a center point common to all of said arcs, each of said arcs being provided with a gap for the purpose of assisting in testing a compass or other circle describing instrument, one of whose legs is placed on the arc which represents the diameter of the circle for which the compass is set and whose other leg is arranged on said center point.

4. A compass scale, comprising a member having a plurality of segmental sections that branch radially from a center common to all of said sections, and arcs of circles in each section, the radii of consecutive arcs within a section increasing or decreasing on the basis of a regular spacing from or to a common center point, each of said arcs being provided with a numeral which corresponds to the diameter of the circle of which the arc forms a part and the various sections being provided with means which shows that the arcs of one section represent circles of different diameters from the circles represented by the arcs of a different section.

WEBSTER V. POGUE.